United States Patent
Riding

(10) Patent No.: US 8,997,695 B2
(45) Date of Patent: Apr. 7, 2015

(54) CASTING PET TOY

(76) Inventor: Rainy Riding, Logan, UT (US)

(*) Notice: Subject to any disclaimer, the term of this patent is extended or adjusted under 35 U.S.C. 154(b) by 164 days.

(21) Appl. No.: 13/213,962

(22) Filed: Aug. 19, 2011

(65) Prior Publication Data

US 2012/0042836 A1   Feb. 23, 2012

Related U.S. Application Data

(60) Provisional application No. 61/375,142, filed on Aug. 19, 2010.

(51) Int. Cl.
*A01K 29/00* (2006.01)
*A01K 15/02* (2006.01)

(52) U.S. Cl.
CPC .................................... *A01K 15/025* (2013.01)

(58) Field of Classification Search
USPC .......................................... 119/702, 707, 708
See application file for complete search history.

(56) References Cited

U.S. PATENT DOCUMENTS

| | | | | |
|---|---|---|---|---|
| 2,307,905 A | * | 1/1943 | Ament | 119/708 |
| 4,499,855 A | * | 2/1985 | Galkiewicz | 119/708 |
| 4,712,510 A | * | 12/1987 | Tae-Ho | 119/708 |
| 4,770,123 A | | 9/1988 | Bell | |
| 4,930,448 A | | 6/1990 | Robinson | |
| 4,940,018 A | | 7/1990 | Edling | |
| D309,964 S | | 8/1990 | Viner et al. | |
| D318,150 S | | 7/1991 | Eitel et al. | |
| 5,111,771 A | | 5/1992 | Mathews | |
| 5,467,740 A | * | 11/1995 | Redwine | 119/707 |
| 5,474,032 A | | 12/1995 | Krietzman et al. | |
| 5,743,215 A | * | 4/1998 | Zeff | 119/708 |
| 5,755,184 A | | 5/1998 | Neidenberger | |
| 5,782,207 A | | 7/1998 | Goodham | |
| 5,875,737 A | | 3/1999 | Boshears | |
| 5,924,387 A | | 7/1999 | Schramer | |
| 5,947,790 A | | 9/1999 | Gordon | |
| D431,331 S | | 9/2000 | Smith | |
| 6,314,913 B1 | * | 11/2001 | Lettau et al. | 119/707 |
| D452,050 S | | 12/2001 | Ritchey | |
| 6,378,464 B1 | | 4/2002 | Ritchey | |
| 6,401,665 B1 | * | 6/2002 | Gentile | 119/707 |
| 6,481,381 B2 | | 11/2002 | Ritchey | |
| 6,609,944 B1 | * | 8/2003 | Viola | 446/409 |
| D496,408 S | | 9/2004 | Kessler | |
| D547,013 S | | 7/2007 | Tsengas | |
| 2005/0150468 A1 | * | 7/2005 | Fleischhacker | 119/708 |
| 2007/0289550 A1 | * | 12/2007 | Huang | 119/707 |
| 2009/0205580 A1 | * | 8/2009 | Tiefel | 119/708 |
| 2010/0064983 A1 | * | 3/2010 | Ritchey et al. | 119/707 |

OTHER PUBLICATIONS

Safety Sling, www.safetysling.com/wrs1.htm, Aug. 2000, retrieved from internet via wayback machine: Jan. 14, 2014.*
Rainy's® Catalog; 2010; 8 pages.
Rainy's® Catalog; Premium Flies and Materials; 2009; 200 pages.

* cited by examiner

*Primary Examiner* — Kristen C Hayes

(57) ABSTRACT

A casting pet toy for entertaining a pet comprises an elongate rod, a handle grip at a handle end of the elongate rod and a tip eyelet at a tip end of the elongate rod. The casting pet toy can also include a stretchable cord passing through the tip eyelet. The stretchable cord comprises a fixed end and a free end. The fixed end can be secured to the elongate rod at a location proximate to the handle grip. A pet lure can be attached to the free end of the stretchable cord.

13 Claims, 9 Drawing Sheets

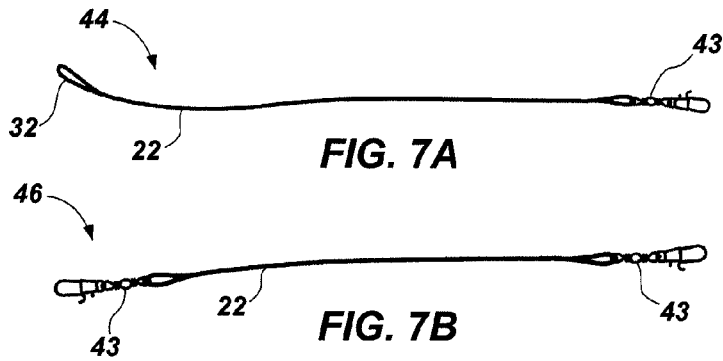
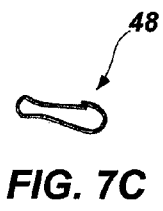
FIG. 7A
FIG. 7B
FIG. 7C
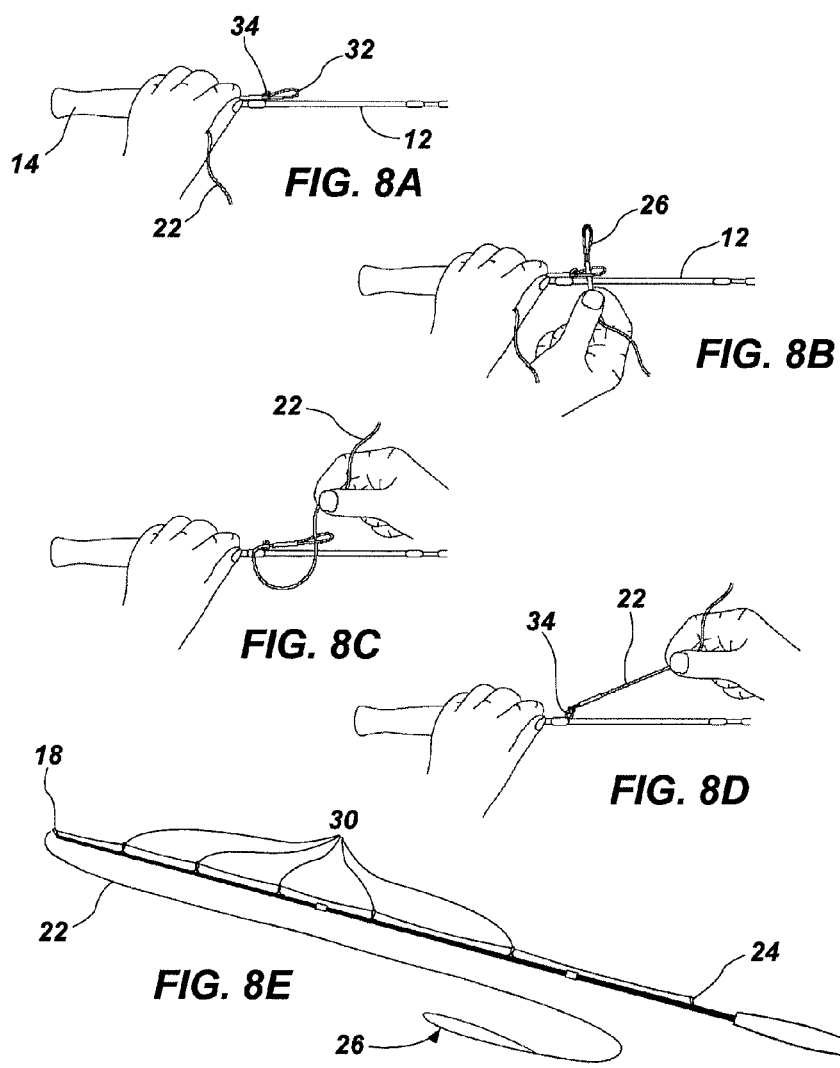
FIG. 8A
FIG. 8B
FIG. 8C
FIG. 8D
FIG. 8E

CASTING PET TOY

PRIORITY DATA

This application claims the benefit of U.S. Provisional Patent Application Ser. No. 61/375,142, filed on Aug. 19, 2010, which is incorporated herein by reference in its entirety.

FIELD OF THE INVENTION

The invention relates to the field of pet toys for entertaining and exercising pets, such as cats, dogs and other small animals.

BRIEF DESCRIPTION OF THE DRAWINGS

Features and advantages of the present invention will be apparent from the detailed description that follows, and when taken in conjunction with the accompanying drawings together illustrate, by way of example, features of the invention. It will be readily appreciated that these drawings merely depict representative embodiments of the present invention and are not to be considered limiting of its scope, and that the components of the invention, as generally described and illustrated in the figures herein, could be arranged and designed in a variety of different configurations. Nonetheless, the present invention will be described and explained with additional specificity and detail through the use of the accompanying drawings, in which:

FIGS. 7A-7C together illustrate various pet lure coupling devices for use with the casting pet toy of FIG. 1;

FIGS. 8A-8E visually illustrates one method for attaching the stretchable cord to the elongate casting rod, in accordance with another representative embodiment;

DETAILED DESCRIPTION OF EXEMPLARY EMBODIMENTS

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made without departing from the spirit and scope of the present invention. As such, the following detailed description is not intended to limit the scope of the invention as it is claimed, but rather is presented for purposes of illustration, to describe the features and characteristics of the representative embodiments, and to sufficiently enable one skilled in the art to practice the invention. Accordingly, the scope of the present invention is to be defined solely by the appended claims.

Furthermore, the following detailed description and representative embodiments of the invention will best be understood with reference to the accompanying drawings.

Illustrated in FIGS. 1-16 are several representative embodiments of a casting pet toy, which embodiments also include various methods for assembling the pet toy and for using it to entertain a pet. As described herein, the casting pet toy provides several significant advantages and benefits over other toys and methods for entertaining pets. However, the recited advantages are not meant to be limiting in any way, as one skilled in the art will appreciate that other advantages may also be realized upon practicing the present invention.

Figure 1:
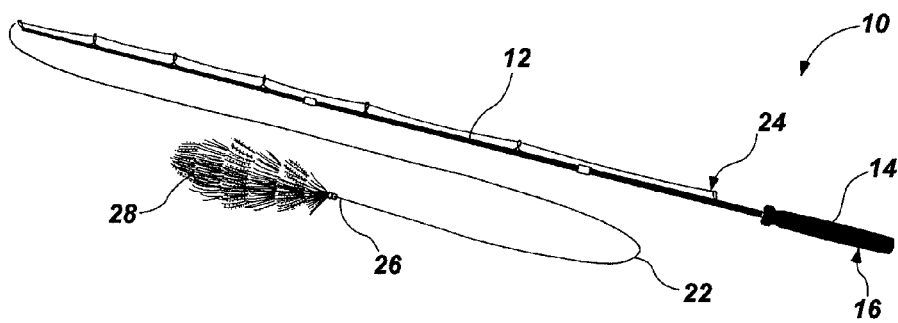
FIG. 1 illustrates a casting pet toy, in accordance with one representative embodiment.

FIG. 1 illustrates one representative embodiment of a casting pet toy 10 that includes an elongate rod 12 having a longitudinal axis 21, a handle grip 14 at a handle end 16, and a tip eyelet 18 at a tip end 20. In one aspect the tip eyelet can project outwardly from the tip end at an angle that is transverse to the longitudinal axis. The pet toy may also include a cord 22, such as a stretchable cord, that can pass through the tip eyelet and which can have a fixed end 24 and a free end 26, with the fixed end being secured to the elongate rod at a location that is proximate the handle grip. The pet toy may further include a pet lure 28 attached to the free end of the stretchable cord.

Figure 2A:
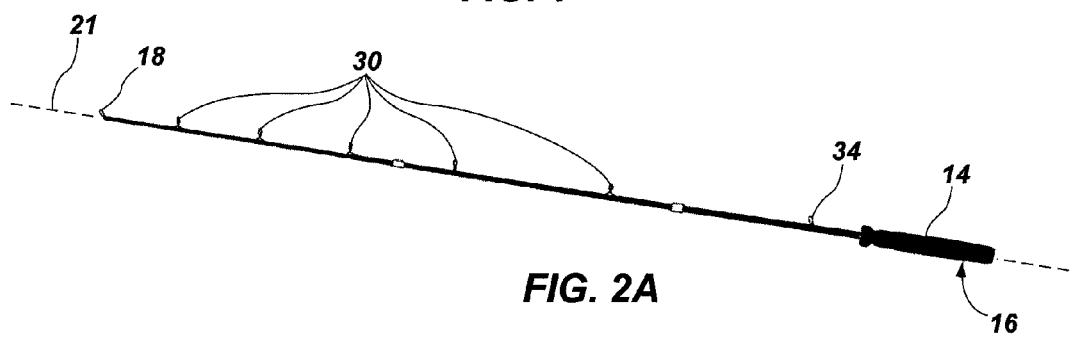
FIGS. 2A and 2B together illustrate the elongate rod of the casting pet toy of FIG. 1 in assembled and disassembled states.
Figure 2B:
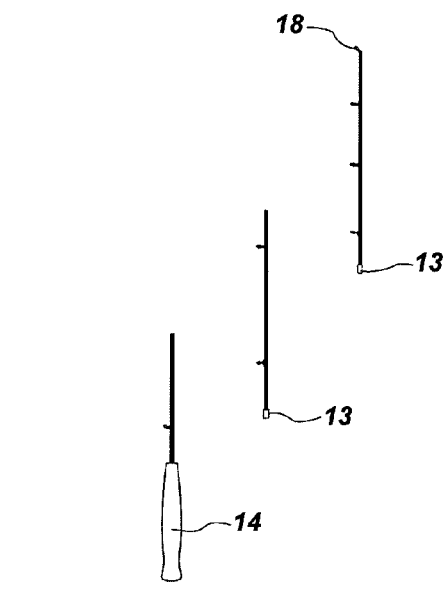

FIGS. 2A-2B illustrate the elongate rod 12 of the casting pet toy 10 of FIG. 1 in both assembled and disassembled states, respectively. As can be seen, the elongate rod can be assembled from multiple pieces to create a rod having a length suitable for providing leverage for casting, while still capable of being broken down or disassembled into smaller pieces for easier storage and/or transportation, etc. Although the representative elongate rod of FIG. 1 is shown as an assembly of three pieces (FIG. 2B), it is also possible for the rod to be assembled from two pieces (FIG. 3) and from four or more pieces (not shown). Alternatively, the elongate rod can also be constructed from a single piece of unbroken material.

The individual pieces of the elongate rod 12 can be provided with cylindrical end fittings 13 that are sized and shaped to provide a tight slip fit with a non-fitting end of the adjacent piece. In one aspect the individual pieces can be made from a strong but flexible composite material, such as graphite or fiberglass. For instance, the elongate rod may be formed from blanks of 24-ton high modulus, carbon graphite or similar composite material. As may be appreciated by one of skill in the art, however, other materials for the elongate rod such as plastic, wood or a light-weight metal (such as aluminum, etc.) are also possible and can be considered to fall within the scope of the present invention. Moreover, the elongate rod can be formed with a solid cross section, a hollow cross section, or combinations thereof, etc., so as to provide a structure that can be manufactured both easily and inexpensively while still meeting requirements for strength and durability. In one aspect the structural design and the material forming both the elongate rod 12 and the end fittings 13 can be configured together to provide the rod with substantial flexibility and the capability to significantly bend without breaking, which flexibility can augment the elastic characteristics of the stretchable cord 22.

Referring back to FIG. 2A, the elongate rod 12 can be provided with one or more eyelets 30 in addition to the tip eyelet 18, which additional eyelet(s) project outwardly from the rod at one or more mid-span locations between the handle grip 14 and the tip eyelet, and with the cord 22 being threaded there through. The additional eyelet(s) 30 can be spaced along the length of the rod so as to maintain the cord adjacent with the rod except when pulled outwardly by the user of the pet toy 10, as described below. Furthermore, in one aspect a plurality of additional eyelets can be mounted to the elongate rod between the tip eyelet and the base eyelet 34, and can be configured with a spacing between any two adjacent eyelets that continuously decreases from a base eyelet proximate the handle end 16 to the tip eyelet 18. This continuous reduction in spacing can serve to keep the cord from falling outwardly or away from the elongate rod during the casting motion, and can thereby reduce the potential of the cord for becoming entangled with itself or with the elongate rod or for becoming snagged on a nearby object, etc.

Figure 3:
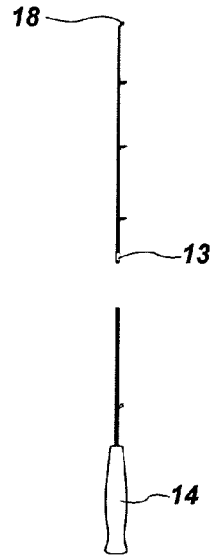
FIG. 3 illustrates an elongate rod of the casting pet toy, in accordance with another representative embodiment.

As shown in FIGS. 1-3, the elongate rod 12 can be reel-less (e.g. without a reel for the stretchable cord 22), and the fixed end 24 of the stretchable cord 22 can be attached directly to the elongate rod proximate to, or within a few inches of, the handle grip 14. For instance, the fixed end of the cord can be tied to a base eyelet 34 with an intertwined single-loop connection or similar knot. This type of easily-implemented connection can be accomplished when one or both ends of the cord are provided with a permanent or integral loop 32, which can be provided for in a variety of ways.

Figure 4A:
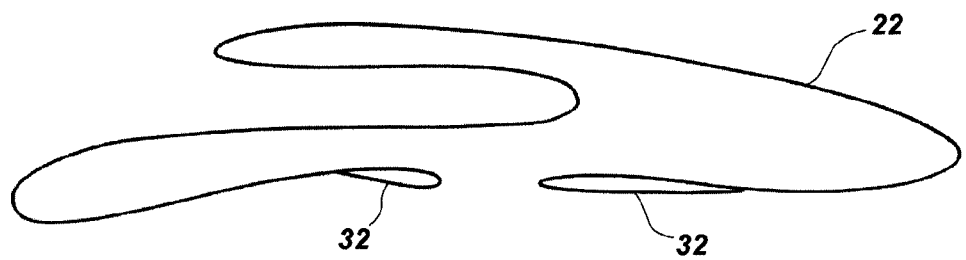
FIGS. 4A and 4B together illustrate various embodiments of a stretchable cord.
Figure 4B:
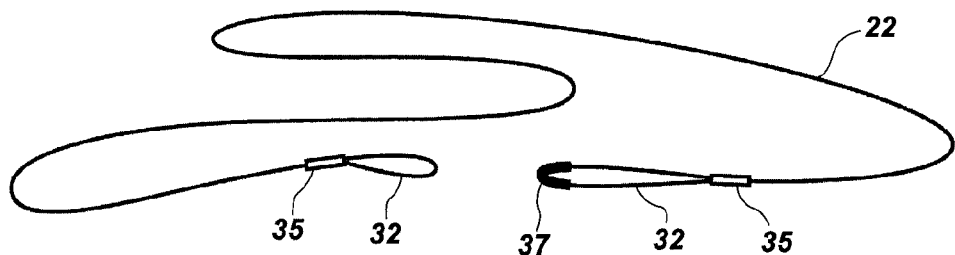

For instance, as illustrated in FIG. 4A, a permanent or integral loop 32 can be formed in one or both ends of the cord 22 during the initial manufacturing process, such as wherein a central elastic core of longitudinal fibers is doubled-back upon itself and an outer sheath is wrapped around to permanently bind the two sections of central core together. Alternatively, a loop can be formed into one or both ends of the cord with a separately-attached coupler 35 that binds the free end of the cord to a portion of the cord proximate the free end, as illustrated in FIG. 4B. The coupler version can be especially effective with embodiments requiring extra load-bearing capabilities, such as with pet toys used with larger dogs. In another aspect the loops 32 can also be formed by tying one or both ends to the length of the cord with a knot. If so desired, a wear sleeve 37 may also be installed within one or more of the permanent loops to reinforce and protect the cord 22 in a high-friction location.

As stated above, in one aspect the cord 22 of the casting pet toy 10 can be stretchable. For instance, the cord can be made from stretchable or elastic nylon string, and can stretch or elastically deform at least about an additional ten to fifteen percent or more from an initial length of the cord in an unstretched state without undergoing permanent plastic deformation or breakage of the nylon material. In one specific aspect the stretchable cord can be stretchable or elastic up to and including about twenty percent of its unstretched state. The stretchable cord can be advantageous by allowing the user of the casting pet toy to more easily fling the pet lure about, as well as to apply a more gradual tension to the pet lure 28 when it is held in the jaws of the pet and to avoid hurting the animal.

Figure 5:
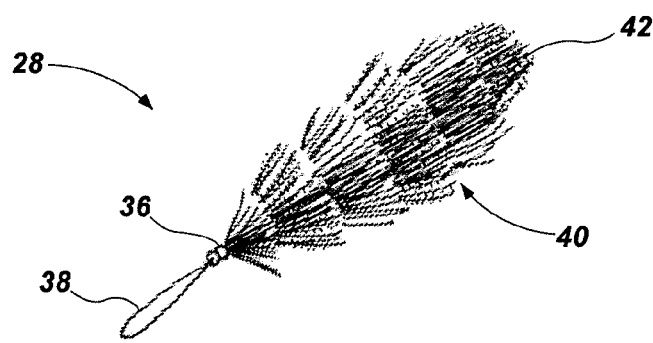
FIG. 5 illustrates the pet lure of the casting pet toy of FIG. 1.
Figure 6A:
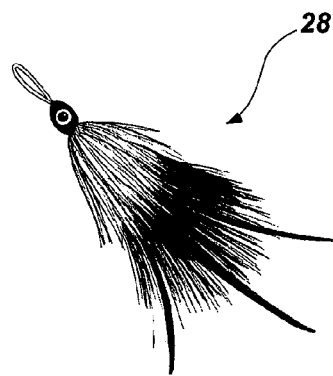
FIGS. 6A-6F together illustrate various interchangeable pet lures for use with the casting pet toy of FIG. 1.
Figure 6B:
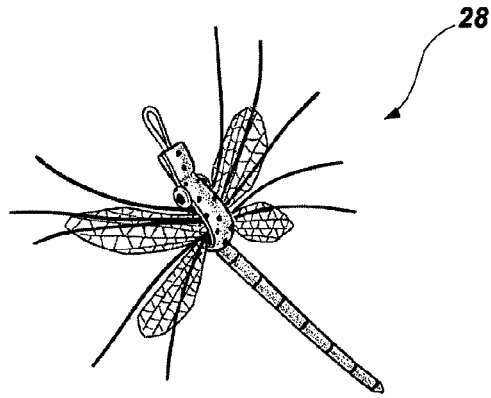
Figure 6C:
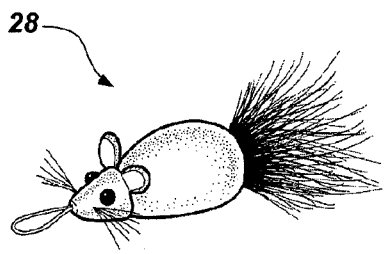
Figure 6D:
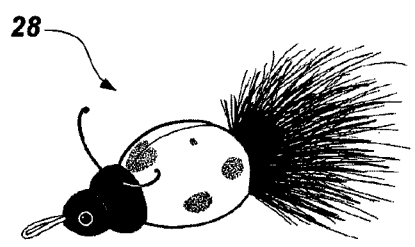
Figure 6E:
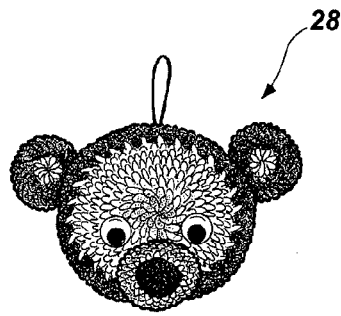
Figure 6F:
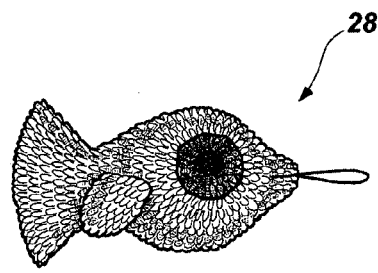
Figure 9A:
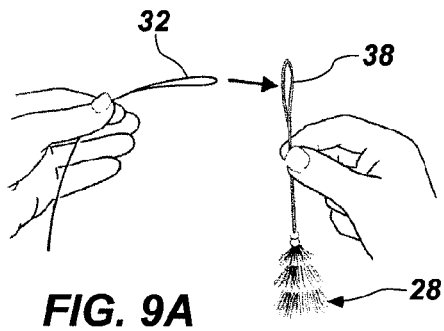
FIGS. 9A-9G visually illustrate a method for attaching a pet lure to the stretchable cord, in accordance with another representative embodiment.
Figure 9B:
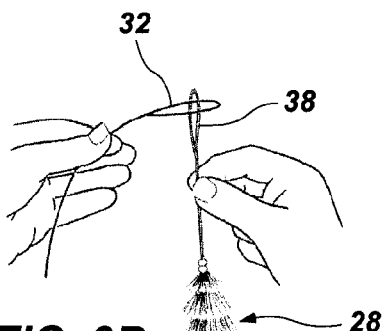
Figure 9C:
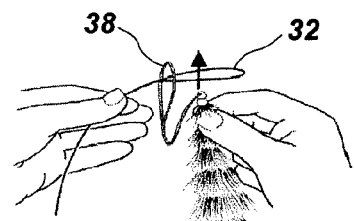
Figure 9D:
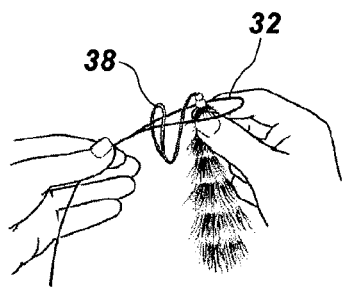
Figure 9E:
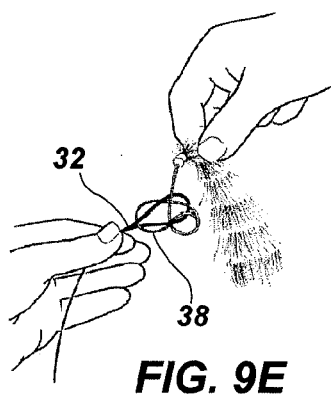
Figure 9F:
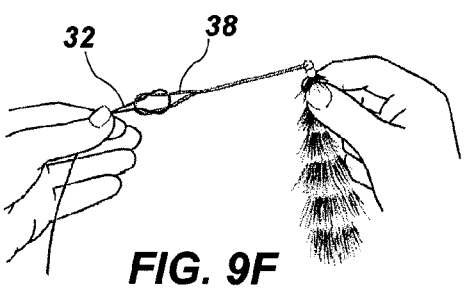
Figure 9G:
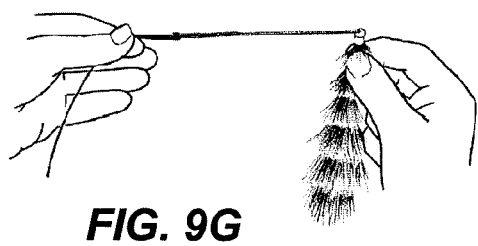

The pet lure 28 of the representative casting pet toy 10 of FIG. 1 is shown with more detail in FIG. 5. As illustrated, in one aspect the pet lure can include a body 36 for providing a casting weight, an attachment loop 38 extending from a front end of the body for attachment to the free end 26 of the stretchable cord, and a lure feature 40 serving as a visible lure to the pet. As shown in FIG. 5, the lure feature can be a feathered tail 42 or similar structure extending from the body opposite the front end. However, other types of pet lures with different lure features are shown in FIGS. 6A-6E, including substantially-solid pet lures having rugged bodies made from rubber or plastic material (FIGS. 6B-6D), and crochet pet lures made from a yarn or string material that can be both soft and durable (FIGS. 6E-6F). Furthermore, in some aspects the lure feature can be a graphic design on the outer surface of the body used in combination with the structure or shape of the pet lure itself.

Illustrated in FIGS. 7A-7C are various pet lure connectors or coupling devices for use with the casting pet toy 10 to connect the pet lure 28 to the free end 26 of the cord 22, and which in certain aspects can allow for rotational movement of the pet lure about the free end of the cord. For example a swivel 43 or plurality of swivels may allow for rotation of the pet lure about the free end of the cord. FIG. 7A shows a single-swivel loop connector 44 while FIG. 7B shows a double-swivel loop connector 46, both of which can include a more durable section of cord or string which can better resist the biting, chewing or clawing of the animal as it interacts with the pet lure 28. Alternatively, as shown in FIG. 7C, a simple clasp ring 48 can also be used to connect the pet lure to the free end of the cord.

FIGS. 8A-8E visually illustrate one method for attaching the cord 22 to the elongate casting rod 12 to form an intertwined single-loop connection. As can be seen, a loop 32 in the fixed end of the cord can be inserted through a base eyelet 34 (FIG. 8A), after which the free end 26 can be drawn through the loop (FIG. 8B) and the cord pulled tight (FIGS. 8C-8D) to form the single loop connection. The cord can then be inserted through any mid-span eyelets 30 and through the tip eyelet 18 at the tip end 20 of the elongate rod (FIG. 8E).

FIGS. 9A-9G visually illustrate one method for attaching a pet lure 28 to the stretchable cord 22 with an intertwined loop-to-loop or double-loop connection. As can be seen, a loop 32 in the free end 26 of the cord can be inserted through an attachment loop 38 extending from a front end of the pet lure (FIGS. 9A-9B), after which the pet lure itself can be passed through the loop in the free end of the cord (FIGS. 9C-9E) and the two cords pulled in opposite directions (FIGS. 9F-9G) to form the intertwined loop-to-loop connection.

Figure 10A:
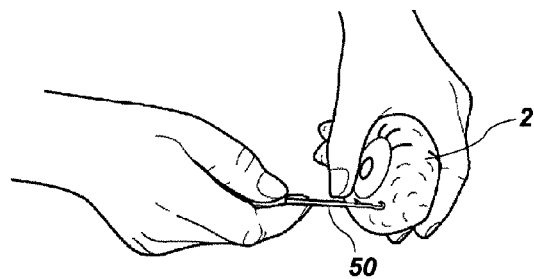
FIGS. 10A-10G visually illustrate a method for attaching a pet lure to a pet lure coupling device, in accordance with yet another representative embodiment.
Figure 10B:
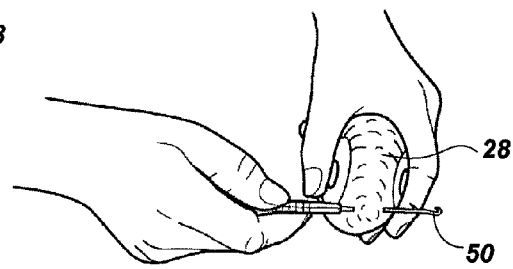
Figure 10C:
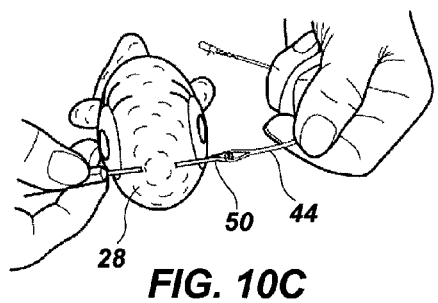
Figure 10D:
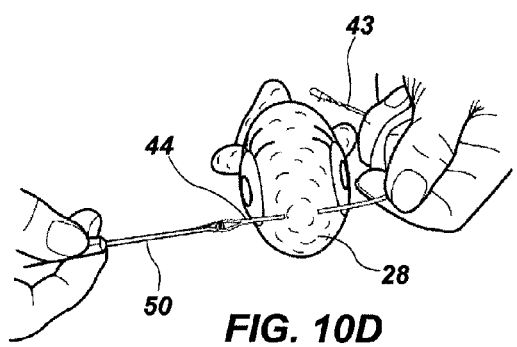
Figure 10E:
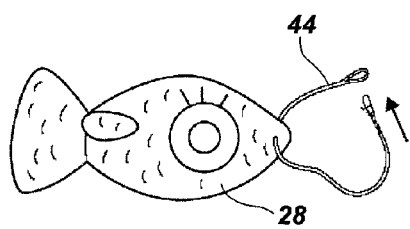
Figure 10F:
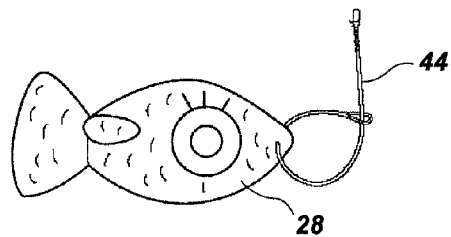
Figure 10G:
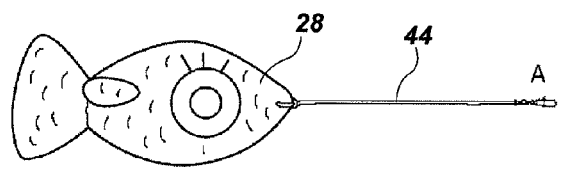

FIGS. 10A-10G visually illustrate another method for attaching a crochet-type pet lure to a pet lure coupling device, such as the single-swivel loop connector 44 previously described in FIG. 7A. As can be seen, a crochet hook 50 can be used to first penetrate the body of the crochet pet lure (FIGS. 10A-10B) and then hook to and draw the loop end of the single-swivel loop connector back through the body of the lure (FIGS. 10C-10D). The swivel hook can then be passed through the loop in the loop end of the connector (FIG. 10F) and drawn tight to form a single loop connection within the front end of the body of the pet lure (FIG. 10G). The swivel hook can then be clipped to the loop in the free end of the cord.

Figure 11A:
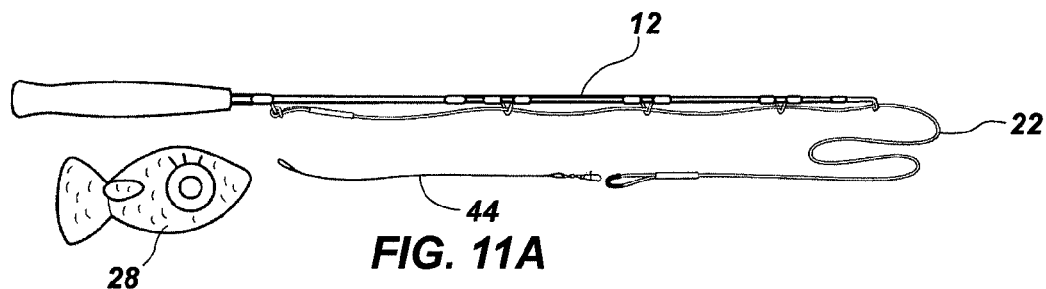
FIGS. 11A-11B together illustrate a casting pet toy, in accordance with various other representative embodiments.
Figure 11B:
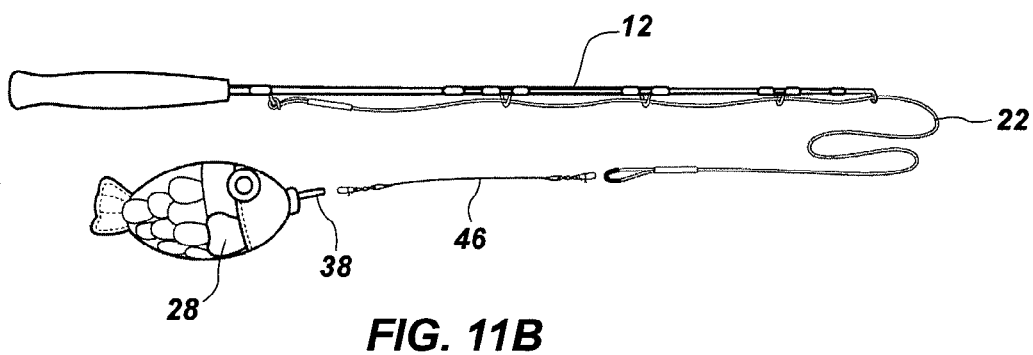

One aspect of the complete casting pet toy 10 is shown in FIG. 11A, in which a single-swivel loop connector 44 can be used to connect a pet lure 28 without an attachment loop (such as that described above with reference to FIGS. 10A-10G) to the free end of the cord 22. Another aspect of the complete casting pet toy is shown in FIG. 11B, in which a double-swivel loop connector 46 can be used to connect a pet lure 28 that does include an attachment loop, but which is also too big to pass through the loop in the free end of the cord to form a loop-to-loop connection.

Figure 12A:
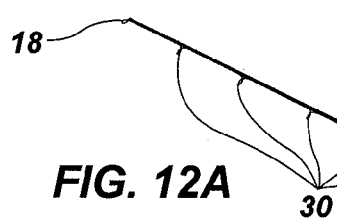
FIGS. 12A-12B together illustrate a casting pet toy, in accordance with yet another representative embodiment.
Figure 12B:
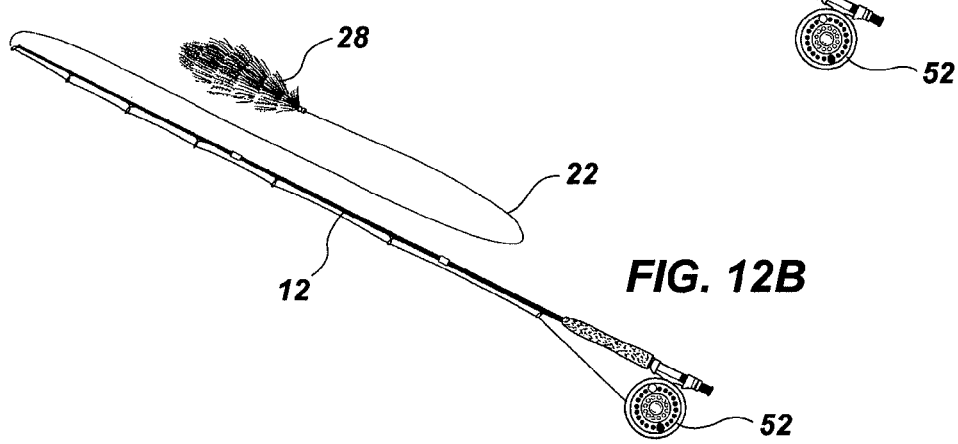

FIGS. 12A-12B together illustrate another aspect of the casting pet toy 10 that includes a reel 52 for the cord 22 attached to the handle of the elongate rod 12. The cord reel can be useful for storing a portion of the length of the cord, which can be stretchable, when not in use. This embodiment of the casting pet toy can be especially useful with larger pets, such as dogs, as the active length of the cord can then be lengthened as desired to create a longer casting radius. Other characteristics of the casting pet toy described above, such as the graphite elongate rod, multiple mid-span eyelets 30, the stretchable cord and the interchangeable pet lures, can each be applied to the embodiment of FIGS. 12A-12B as needed.

Figure 13:
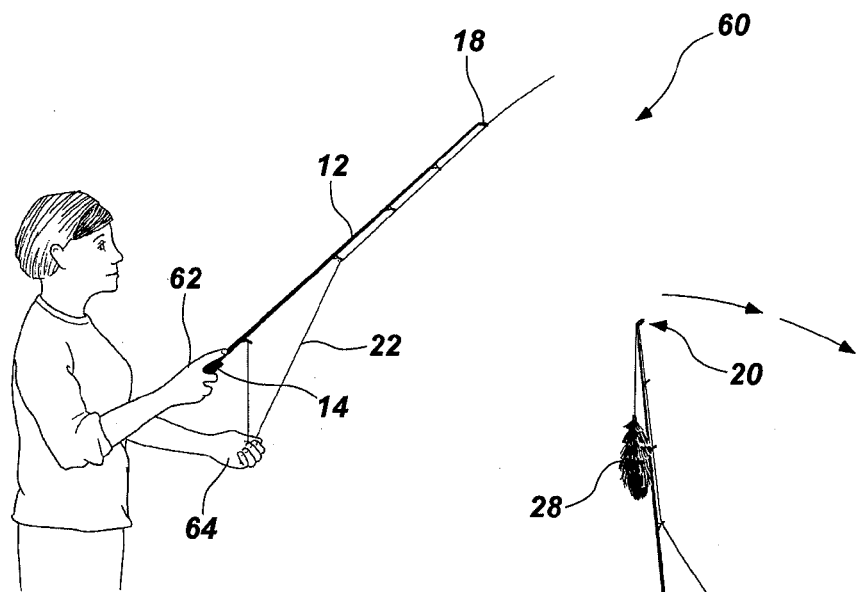
FIGS. 13-15 visually illustrate a method for casting a casting pet toy, in accordance with another representative embodiment.
Figure 14:
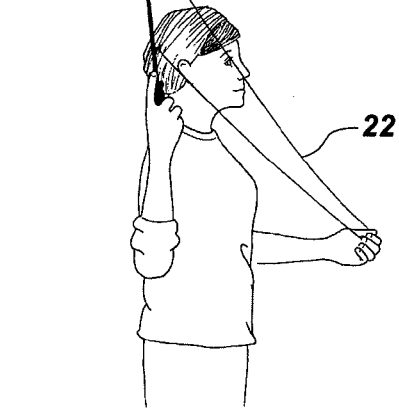
Figure 15:
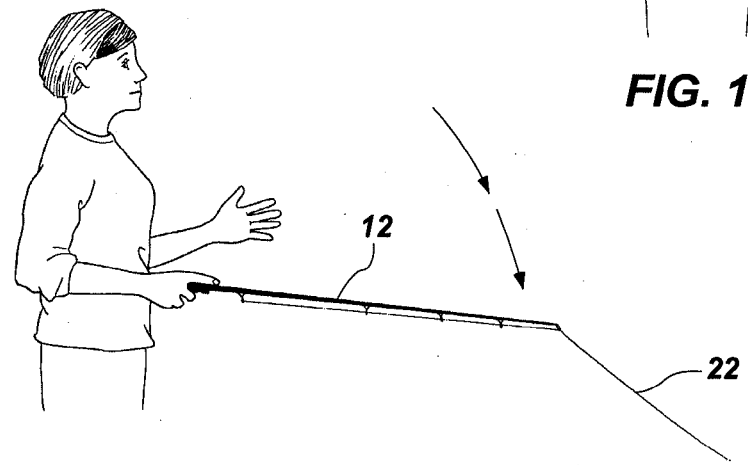

FIGS. 13-15 visually illustrate a method 60 for casting a casting pet toy in accordance with one representative embodiment. The method includes grasping the handle grip 14 with a first hand 62, grasping the stretchable cord 22 between the handle grip and the tip eyelet 18 with a second hand 64 (FIG. 13) and pulling the stretchable cord 22 between the handle grip 14 and the tip eyelet 18 transversely away from the rod 12 to draw the pet lure 28 towards the tip end 20 of the rod (FIG. 14). The method further includes swinging the rod through at least a portion of an arc in a first direction and releasing the stretchable cord to cast the pet lure away from the tip end of the rod (FIG. 15).

Figure 16:
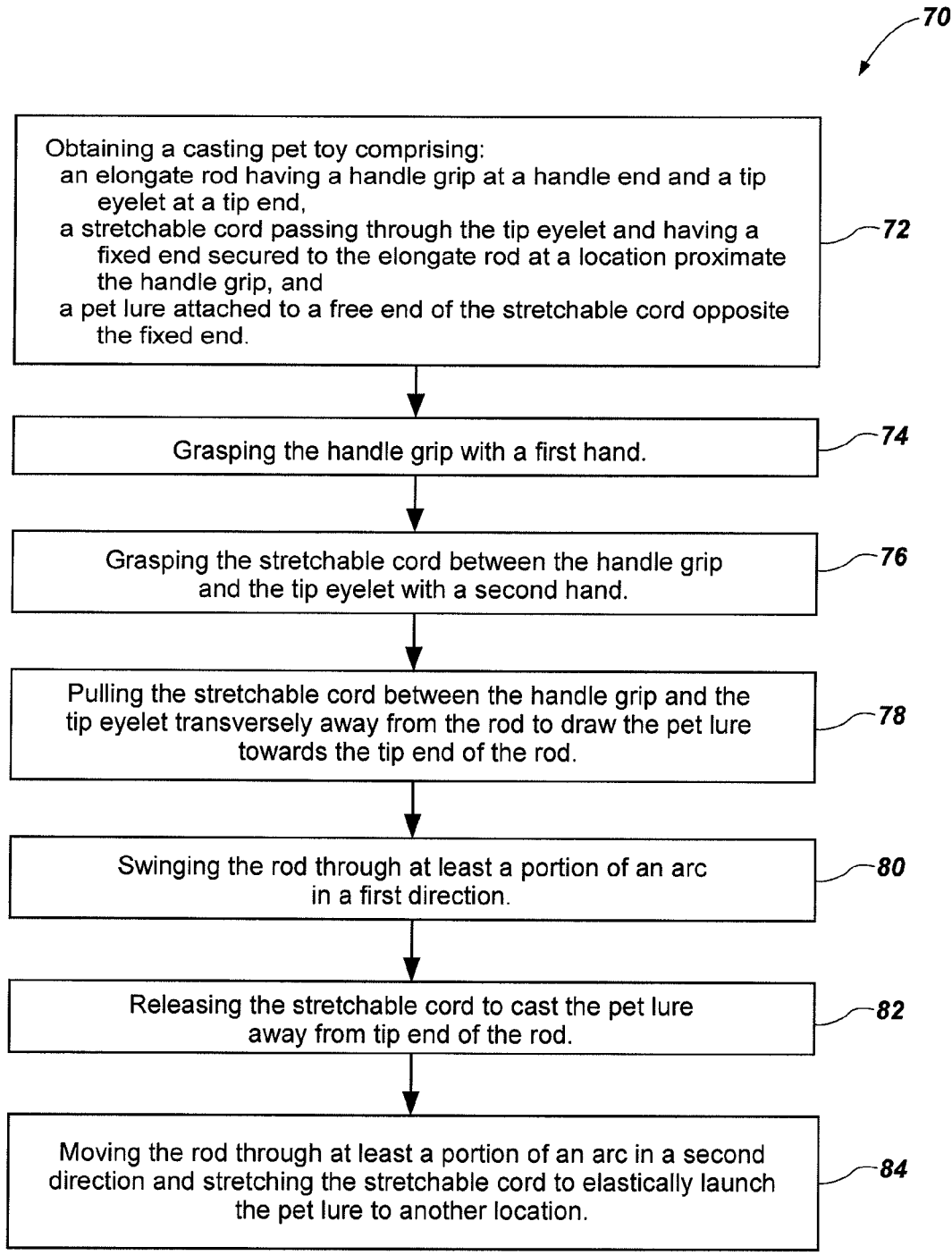
FIG. 16 is a flowchart depicting a method for entertaining a pet, in accordance with another representative embodiment.

FIG. 16 is a flowchart depicting a method 70 for entertaining a pet which includes, as shown at 72, the step of obtaining a casting pet toy. The pet toy can comprise an elongate rod having a handle grip at a handle end and a tip eyelet at a tip end, a stretchable cord passing through the tip eyelet and having a fixed end secured to the elongate rod at a location proximate to the handle grip, and a pet lure attached to a free end of the stretchable cord opposite the fixed end.

Similar to the method illustrated in FIGS. 13-15, the method 70 for entertaining a pet may also include, as shown at 74, 76 and 78, the steps of grasping the handle grip with a first hand, grasping the stretchable cord between the handle grip and the tip eyelet with a second hand, and pulling the stretchable cord between the handle grip and the tip eyelet transversely away from the rod to draw the pet lure towards the tip end of the rod. At 80, the rod can be swung through at least a portion of an arc in a first direction and, as shown at 82, the stretchable cord can be released to cast the pet lure away from the tip end of the rod. If so desired, the method for entertaining a pet can include, as shown at 84, at least one additional step of moving the rod through at least a portion of an arc in a second direction and stretching the stretchable cord to elastically launch the pet lure to another location.

The foregoing detailed description describes the invention with reference to specific representative embodiments. However, it will be appreciated that various modifications and changes can be made without departing from the scope of the present invention as set forth in the appended claims. The detailed description and accompanying drawings are to be regarded as illustrative, rather than restrictive, and any such modifications or changes are intended to fall within the scope of the present invention as described and set forth herein.

More specifically, while illustrative representative embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, any steps recited in any method or process claims, furthermore, may be executed in any order and are not limited to the order presented in the claims. The term "preferably" is also non-exclusive where it is intended to mean "preferably, but not limited to." Accordingly, the scope of the invention should be determined solely by the appended claims and their legal equivalents, rather than by the descriptions and examples given above.

What is claimed and desired to be secured by Letters Patent is:

1. A casting pet toy for entertaining a pet, comprising:
   an elongated rod, a handle grip at a handle end and a tip eyelet at a tip end;
   a stretchable cord passing through the tip eyelet and having a fixed end and a free end, wherein the fixed end is secured to the elongated rod at a base eyelet with an intertwined single-loop connection;
   a plurality of eyelets between the tip eyelet and the base eyelet and the stretchable cord being threaded therethrough, wherein a spacing between any two adjacent eyelets continuously decreases from the base eyelet to the tip eyelet; and
   a pet lure attached to the free end of the stretchable cord.

2. The casting pet toy of claim 1, further comprising at least one additional eyelet at a med-span location between the handle grip and the tip eyelet, and the stretchable cord being threaded therethrough.

3. The casting pet toy of claim 1, further comprising a loop integrally formed into the fixed end of the stretchable cord.

4. The casting pet toy of claim 1, wherein the rod is flexible.

5. The casting pet toy of claim 1, wherein the rod is separable into at least two pieces.

6. The casting pet toy of claim 1, further comprising an integral loop formed into the free end of the stretchable cord.

7. The casting pet toy of claim 6, wherein the pet lure is attached to the free end of the stretchable cord with an intertwined loop-to-loop connection.

8. The casting pet toy of claim 1, wherein the stretchable cord further comprises an elastic nylon string.

9. The casting pet toy of claim 1, wherein the stretchable cord elastically stretches at least about fifteen percent of its overall length and returns to its original length without plastic deformation.

10. The casting pet toy of claim 1, wherein the pet lure further comprises:
    a body for providing a casting weight;
    an attachment loop extending from a front end of the body for attachment to the free end of the stretchable cord; and
    a lure feature serving as a visible lure to the pet.

11. The casting pet toy of claim 10, wherein the lure feature is a feathered tail extending from the body opposite the front end.

12. The casting pet toy of claim 10, wherein the lure feature is a graphic design on the outer surface of the body.

13. The casting pet toy of claim 10, wherein the pet lure is a crochet figure.

\* \* \* \* \*